Sept. 29, 1970     R. A. RAVENEL     3,531,234
CAMSHAFT VALVE GEAR FOR ENGINE CYLINDER HEAD
Filed July 15, 1968     8 Sheets-Sheet 5

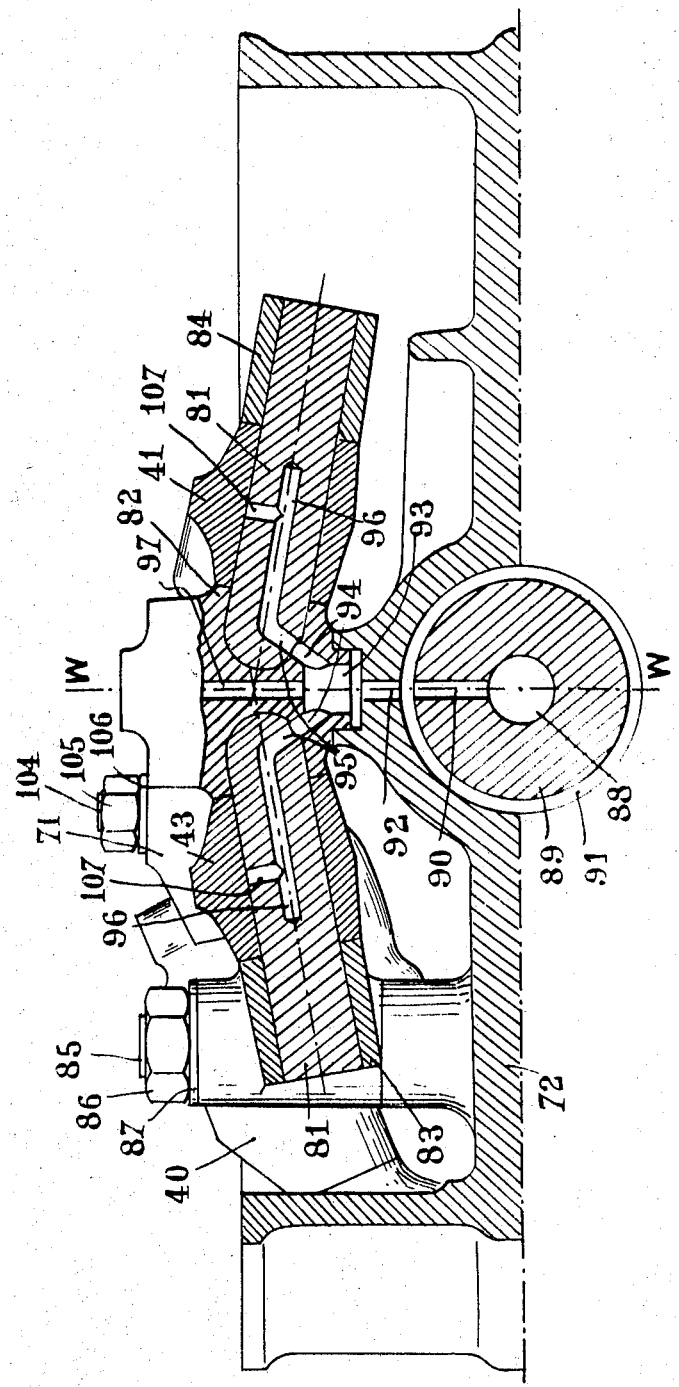

United States Patent Office 3,531,234
Patented Sept. 29, 1970

3,531,234
CAMSHAFT VALVE GEAR FOR ENGINE CYLINDER HEAD
Raymond A. Ravenel, Sceaux, France, assignor to Societe Anonyme Andre Citroen, Paris, France, a French company
Filed July 15, 1968, Ser. No. 744,930
Claims priority, application France, July 19, 1967, 114,801; June 11, 1968, 154,575
Int. Cl. F01l 1/04, 1/18; F01m 9/10; F02b 75/20
U.S. Cl. 123—59         5 Claims

ABSTRACT OF THE DISCLOSURE

The valve axes of this valve gear are not parallel; the tappets interposed between the cams and the rockers consist of cups slidably mounted in bores disposed at right angles to the camshaft and of a connecting member having one ball-shaped end mounted in the bottom of said cup and the opposite end formed with a part-spherical cavity for receiving the ball-shaped driven end of the relevant rocker.

BACKGROUND OF THE INVENTION

This invention relates to valve gears of the type designed for operating valve rockers by means of a camshaft mounted in the cylinder head of the engine.

In known constructions of this character it is not possible to actuate the valves in the conventional manner, i.e. by means of rockers operated directly by the camshaft, when the valve position is selected at random and more particularly when the valve axes are not perpendicular to the camshaft.

This solution, by minimizing the weight of moveable parts, would afford extremely high rotational speeds.

SUMMARY OF THE INVENTION

It is the essential object of this invention to provide an arrangement wherein each valve axis can be disposed as desired while affording nevertheless extremely high engine speeds, since the additional component elements required therefor, in comparison with the conventional valve gear in which the rockers are operated directly by the camshaft, are extremely light in weight and located on the cam side, so that their inertia is considerably less detrimental.

This transmission system comprises a cup-shaped tappet slidably mounted in a bore formed in the cylinder head and having a radial direction with respect to the camshaft, said cup having a bottom receiving on its outer face the thrust exerted by the cam lobe, and on its inner face a connecting member engaging the ball-shaped end of the relevant rocker.

This connecting member may consist either of a small rod having a ball-shaped end engaging a correspondingly shaped cavity formed in the inner face of the cup bottom, the opposite end of said small rod being formed in turn with a ball-shaped cavity engageable by the ball-shaped end of the relevant rocker, or of a dished plate bearing in radial sliding engagement against the open end of the cup.

BRIEF DESCRIPTION OF THE DRAWING

The features and advantages of the invention will appear more completely from the following description given by way of illustration but not of limitation, with reference to the attached drawing, in which:

FIG. 11 is a section taken along the line XI—XI of FIG. 8.

DESCRIPTION OF THE PREFERRED EMBODIMENT

Figure 1:
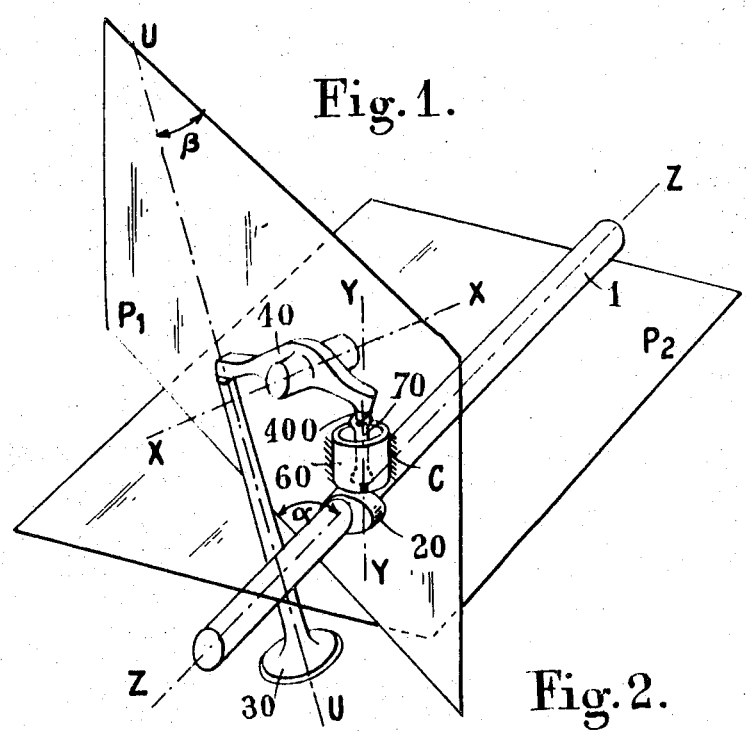
FIG. 1 is a diagram showing the principle of the mechanism for actuating one valve.

Referring first to the diagram of FIG. 1, a shaft 1 revolves about an axis ZZ and carries a cam 20 controlling the reciprocating sliding motion of a valve 30 along its axis UU. The movement of valve 30 is produced by the outer end of one arm of a rocker 40 fulcrumed about an axis XX extending at right angles to UU in the space, said rocker carrying at its opposite driven end a ball-shaped member 400. This ball-shaped end member 400 is responsive to the lobe of cam 20 through the medium of a tappet 60 mounted for axial reciprocation with respect to the axis ZZ and along the axis YY in a bore formed to this end in the cylinder head C, the bottom of said tappet engaging with its outer face the contour of said cam 20 and carrying centrally of its inner face through the medium of a ball-and-socket joint one end of a rod 70 having its other end directed towards said tappet and provided with a part-spherical recess engaged by the aforesaid ball-shaped end member 400 of rocker 40.

The proper operation of this valve gear is obtained when the axis YY (perpendicular to ZZ) is also perpendicular in the space to XX in turn perpendicular to UU.

Under these conditions, the axis XX may be chosen arbitrarily provided only that it is perpendicular to UU. Then the direction of axis YY may be calculated as perpendicular to the plane containing the axis ZZ and parallel to the axis XX.

Conversely, if the direction of the radial thrust YY is given, the direction of axis XX of rocker 40 is then determined as extending at right angles to the plane containing the axes YY and UU.

Figure 6:
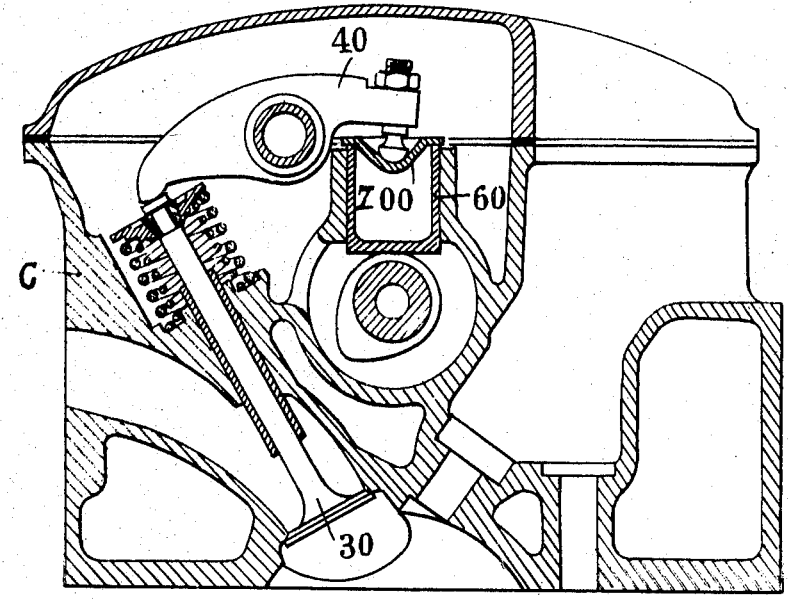
FIG. 6 illustrates in a manner similar to FIG. 4 the mechanism for actuating a single valve with a modified system for transmitting the movement from the cam lobe to the ball-shaped end of the corresponding rocker end.

For connecting the push member or tappet 60 to the ball-shaped end 400 of rocker 40 the arrangement illustrated in FIG. 6 may be substituted for the arrangement described hereinabove with reference to FIG. 1 and shown more in detail in the practical form of embodiment illustrated in FIG. 4. In this simplified arrangement the rod 70 is replaced by a simple dished member 700 bearing in radial sliding engagement against the outer or open contour of cup 60.

From the diagram of FIG. 1 it will be seen that the above-defined requirements are met by taking a plane $P_2$ containing the axis ZZ which is perpendicular to YY as well as a plane $P_2$ projecting orthogonally the axis UU on the plane $P_2$ and selecting the axis XX at right angles to $P_1$ so that this axis XX will be parallel to $P_2$. The spatial direction of axis UU is characterized by the inclinations $\alpha$ and $\beta$ respectively of plane $P_1$ with respect to axis ZZ, and of axis UU with respect to plane $P_2$.

Figure 2:
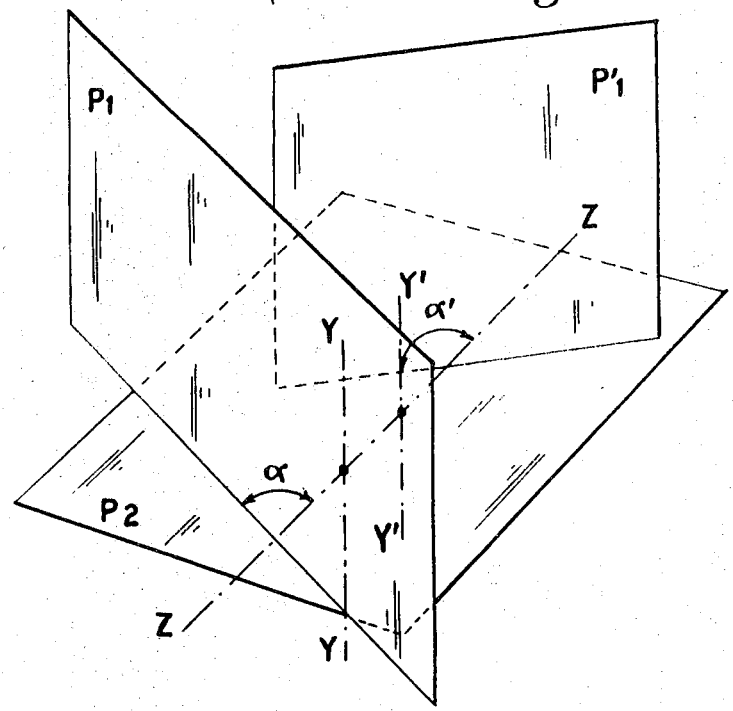
FIG. 2 is a diagram showing a twin-valve gear in which the bores of the two tappets are parallel to each other.

In a conventional valve gear comprising a plurality of valves the axes YY of the various tappets may be assumed to be parallel to each other. FIG. 2 is the diagram illustrating this arrangement, wherein the first valve is operated as shown diagrammatically by the axis YY and the plane $P_1$ inclined by an angle $\alpha$ to the axis ZZ, the second valve corresponding to axis Y'Y' and to plane $P'_1$ inclined by an angle $\alpha'$ with respect to the same axis ZZ. Under these conditions, the plane $P_2$ is common to the disposal of both valves and for technological reasons may be disposed parallel to the plane of the cylinder head.

Figure 3:
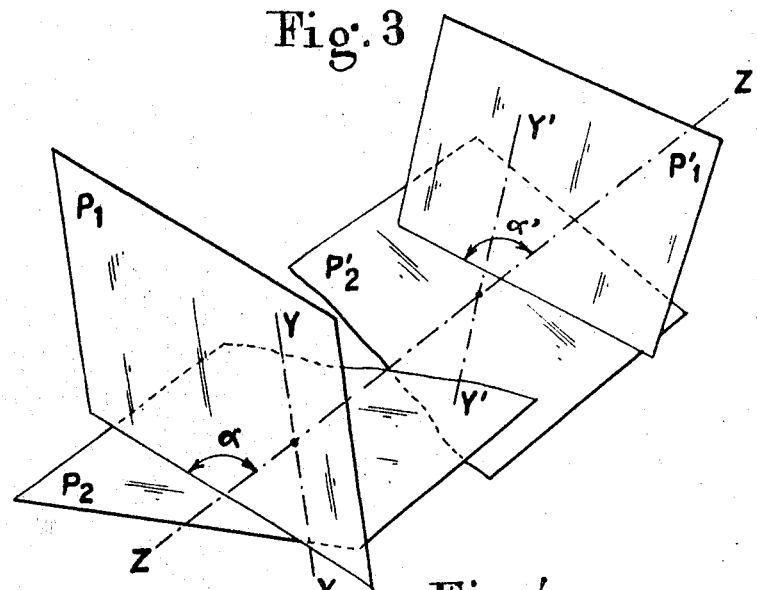
FIG. 3 is a diagram similar to FIG. 2 but concerning a twin valve gear in which the bores receiving the two tappets are set in different radial directions in relation to the camshaft axis.

In order to obtain a more compact assembly, at least in the longitudinal direction, it may be advantageous to have the axes YY not parallel for the different valves, FIG. 3 showing the diagram of this arrangement in the case of two valves having their control tappets adapted to slide along axes YY and Y'Y' respectively. Consequently, in this construction there is not only a plane $P'_1$ separate from plane $P_1$ but also a plane $P'_2$ separate from plane $P_2$.

Figure 4:
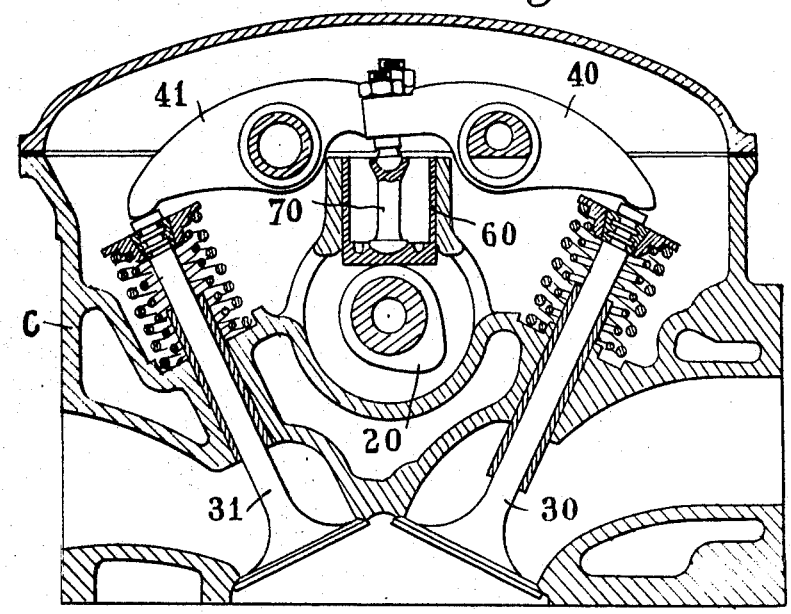
FIGS. 4 and 5 are a vertical section and a plan view respectively showing a three-valve gear in which the bores of the three corresponding tappets are parallel to each other.
Figure 5:
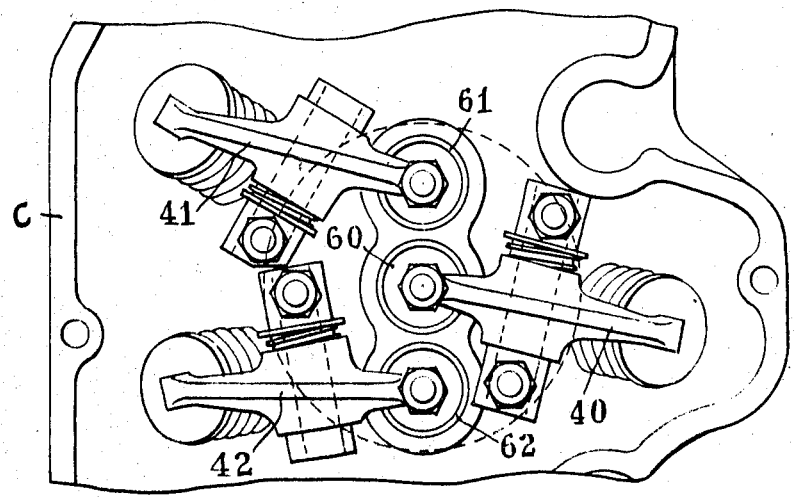

FIGS. 4 and 5 illustrate a typical example of a three-valve gear of the general type shown diagrammatically in FIG. 2. This arrangement comprises the same elements as in FIG. 1 which are designated by the same reference numerals plus one and two units, respectively, for the other valves. In this exemplary arrangement shown more particularly in FIG. 5 the tappets 60, 61 and 62 actuating the relevant valves are slidably mounted in close relationship in the cylinder head case C.

Figure 7:
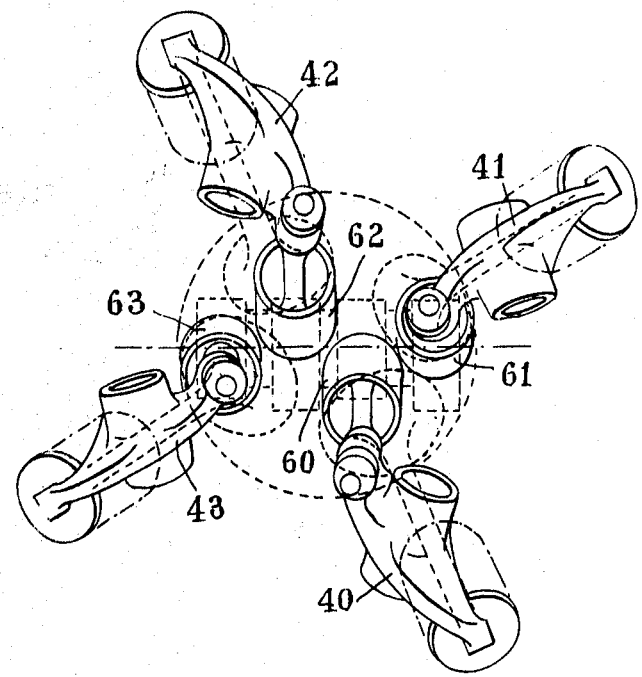
FIG. 7 shows like FIG. 5 a four-valve gear in which the axes of the bores receiving the four tappets have different inclinations.
Figure 8:
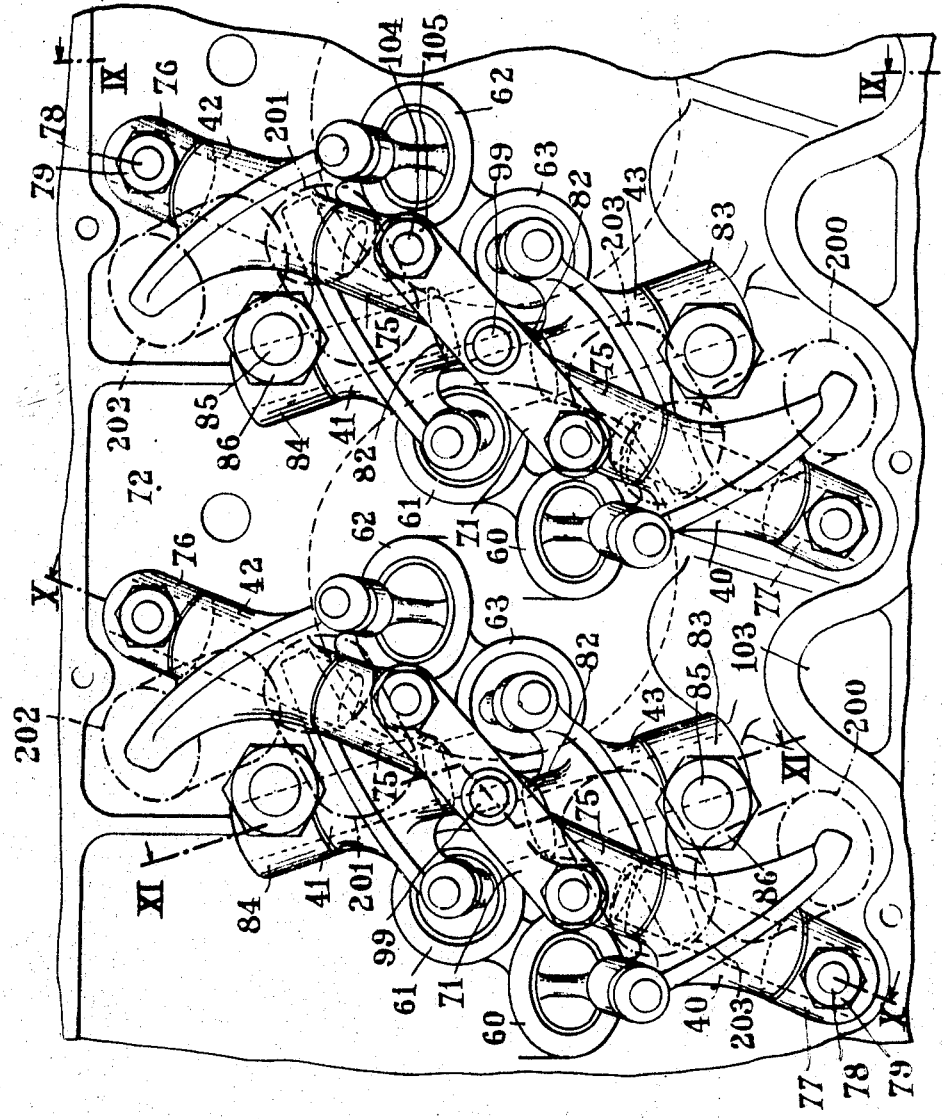
FIG. 8 is a plan view from above showing a cylinder head with the cover removed therefrom to show two adjacent four-rocker assemblies.
Figure 9:
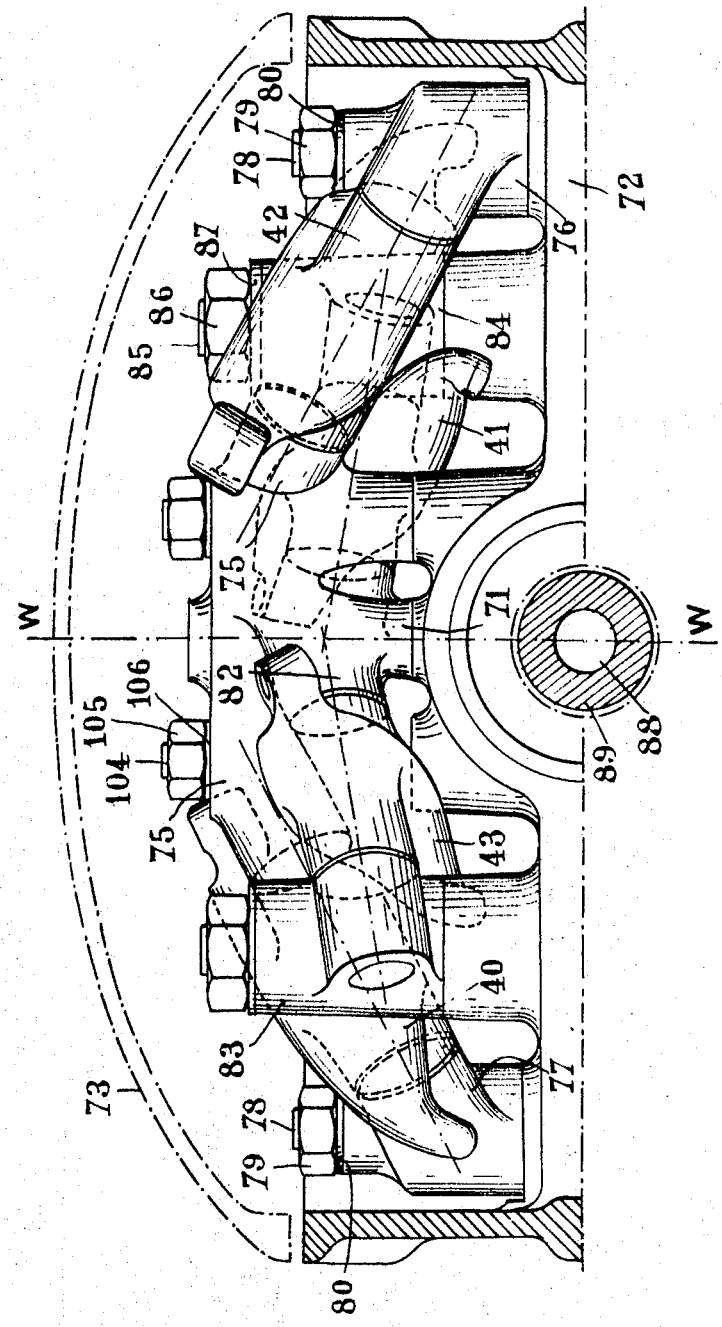
FIG. 9 is an elevational view taken along the line IX—IX of FIG. 8.
Figure 10:
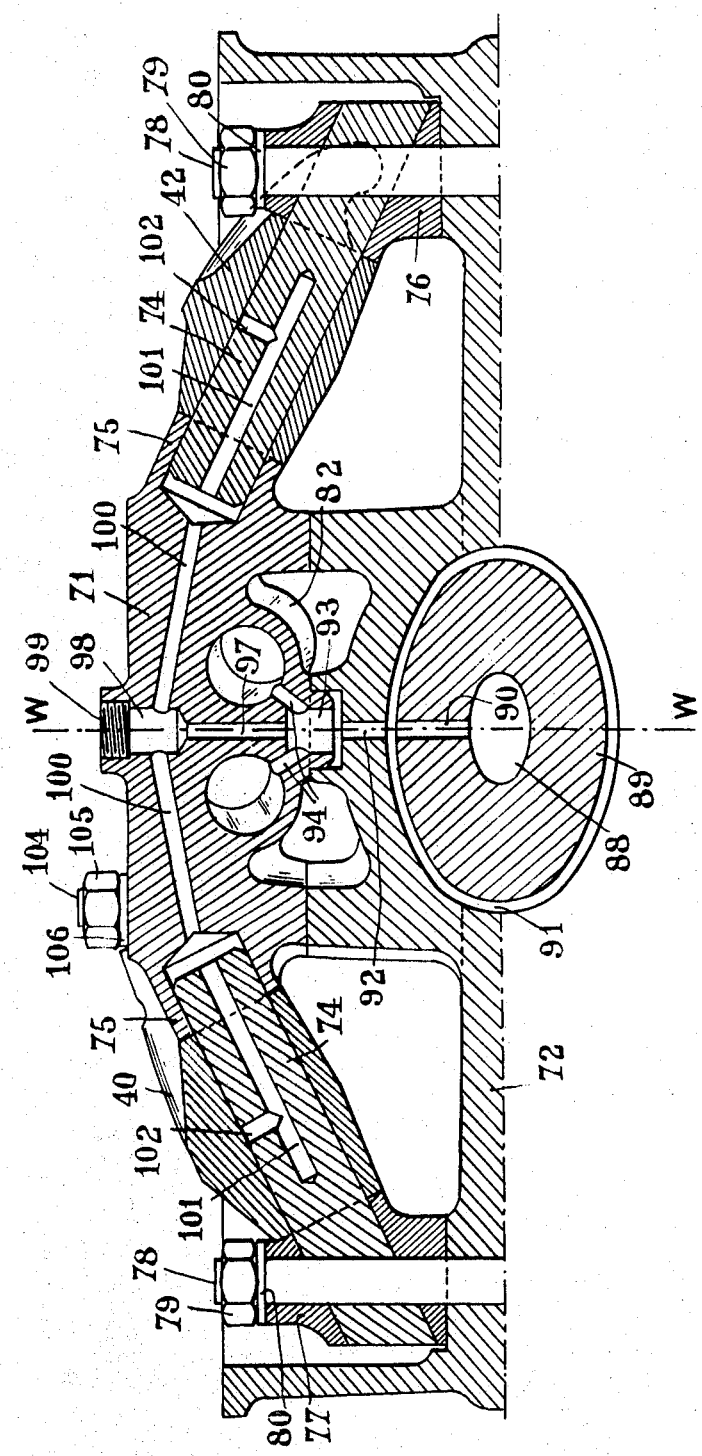
FIG. 10 is a section taken along the line X—X of FIG. 8.

An exemplary valve gear comprising four valves according to the general disposal illustrated diagrammatically in FIG. 3 is shown in FIG. 7. In this disposal the tappets 60, 61, 62 and 63 associated with rockers 40, 41, 42 and 43 respectively have their axes set in different directions, thus providing a particularly compact assembly.

The elementary arrangement of FIG. 7 may be multiplied on a same cylinder head by designing an in-line engine of minimum axial length due to the possibility of concentrating four rockers operating valves of two adjacent cylinders.

A main bracket supporting the four rockers enables these rockers, due to its complex configuration, to oscillate while avoiding the tappet bosses, the spark-plug cavity and the valve springs.

This assembly permits of operating the two valves of a same cylinder and the two valves of an adjacent cylinder while keeping a minimum distance between centers for these cylinders, the center line of the main bracket lying between two adjacent cylinders.

In the specific form of embodiment illustrated in FIGS. 8 to 11 the valve gear comprises four rockers 40, 41, 42, and 43. The shafts of these rockers are solid with a main bracket 71 rigidly secured to the cylinder head 72 between two adjacent cylinders, under the cylinder head cover 73, by means of two stud, nut and washer assemblies 104, 105 and 106.

The rockers 40 and 42 are pivoted on shafts 74 having one end engaged in sockets 75 formed in said main bracket 71 and the opposite end engaged in separate supports 76 and 77. Studs 78, with nuts 79 and washers 80 are provided for securing said supports 76 and 77 to the cylinder head and at the same time lock the shafts 74 against axial movement.

The other rockers 41 and 43 are pivoted on shafts 81 engaging with one end sockets 82 formed in said main bracket 71 and with the opposite end separate supports 83 and 84. Studs 85, with nuts 86 and washers 87 are provided for securing said supports 83 and 84 to the cylinder head 72 and lock the shafts 81 in the axial direction.

These rockers are lubricated from a duct 88 formed axially through the camshaft 89, the oil fed thereto flowing through a radial duct 90 to a circular groove 91 from which it subsequently circulates through the cylinder head 72 via a duct 92 so as to open into a bore 93 formed in the main bracket 71.

The oil fed to this bore 93 is distributed laterally via ducts 94 among two channels 96 formed axially in the shafts 81 of rockers 41 and 43. Radial ducts 107 are provided for lubricating these rockers.

From duct 93 a vertical passage 97 leads the lubricant to a bore 98 closed by a plug 99. From this bore 98 two oblique ducts 100 distribute the oil among two axial passages 101 formed in said rocker shafts 74 for lubricating via radial ducts 102 the rockers 40 and 42.

With the above-described arrangement the main bracket 71 permits of concentrating four rockers, namely rockers 40, 41 associated with one cylinder and rockers 42 and 43 associated with the adjacent cylinder, into a single assembly. The rockers 41 and 42 cross each other in projection on the cylinder head 72, the rocker 42 moving above the rocker 41. In the same manner rocker 40 moves above rocker 43.

The main bracket 71, of which the center line lies between two adjacent cylinders, is further advantageous in that it permits of superposing by pairs the rockers associated with two adjacent cylinders.

Rockers 40, 43, on the one hand, and 41, 42 on the other hand, can thus oscillate while avoiding the bosses 60, 61, 62, 63, the spark plug cavity 103 of each cylinder and the valve springs 200, 201, 202 and 203.

While the above description and the attached drawing refer essentially to specific and preferred forms of embodiment of this invention, it will readily occur to anybody conversant with the art that various modifications and variations may be brought thereto without departing from the spirit and scope of the invention as set forth in the appended claims.

What I claim is:

1. For an engine with in-line cylinders closed by a cylinder head and each provided with four valves, a valve gear comprising a camshaft having an axis extending longitudinally in said cylinder head with each cam adapted to actuate one of said valves, support members mounted substantially transversely to said cylinder head, each support member disposed between two adjacent cylinders forming four pairs of bearings, four shafts mounted in said four pairs of bearings respectively and comprising a first pair of shafts and a second pair of shafts, the two shafts of each pair having their axes, when projected onto the cylinder head, parallel to each other but inclined in opposite directions with respect to said cylinder head, four valve rockers rotatably mounted on said four shafts for actuating two valves in each one of the two cylinders adjacent to the relevant support member, each rocker comprising on either side of its carrier shaft a driving arm for reciprocating a valve along an axis perpendicular to the axis of said carrier shaft, and a driven arm having a part-spherical end, a cup member mounted in said cylinder head for sliding movement along an axis perpendicular to both said camshaft axis and said rocker shaft axis, said cup member having a bottom formed with an inner face shaped to accommodate said part-spherical end, and an outer face engaged by a cam of said camshaft, a rod having a part-spherical end engaged in said inner face of said cup member and an opposite end formed with a part-spherical concavity adapted to engage said part-spherical end of said driven arm of said rocker.

2. A valve gear for an engine having in-line cylinders as set forth in claim 1, wherein said two shafts of said first pair of shafts of said support member are assembled in close relationship to each other and positioned substantially in the middle of said support member, the shafts of said other pair being disposed on either side of said first pair, the driving arm of each one of the rockers carried by said other pair of shafts crossing, in projection onto said cylinder head, the driving arms of the adjacent rocker of the first pair and moving above said last-named rocker, said pair of driving arms being adapted to actuate a valve in each one of the two adjacent cylinders.

3. A valve gear for an engine having in-line cylinders as set forth in claim 1, wherein the two cup members for actuating the two valves of one of the two adjacent cylinders disposed on either side of said support member are housed in the cylinder head on the side of said one cylinder in reference to said support member.

4. A valve gear for an engine having in-line cylinders as set forth in claim 1, wherein each support member consists of a central body secured by screw studs and nuts to the cylinder head and formed with four bearings, four auxiliary members each formed with a bearing complementary to a corresponding one of said four bearings of said central body, and a screw stud with nut which extends through each one of said auxiliary members and at least partially through the shaft engaging the bearing of said auxiliary member for securing said auxiliary member to said cylinder head and locking said last-named shaft against axial and rotational movements.

5. A valve gear for an engine having in-line cylinders as set forth in claim 4, wherein said camshaft has formed therein an axial duct for lubricating oil which is connected via a radial passage to a peripheral groove of said camshaft and communicates with another passage rising in said central member and substantially coaxially thereto, and four divergent ducts extending from said other passage of said central member and opening into the bottom of the four bearings of said central member for communicating with said four rocker shafts, each rocker shaft having a blind axial hole formed therein which communicates on the one hand with one of said divergent ducts and on the other hand via a radial hole with the inner surface of the rocker fulcrumed to said shaft and also with the portion of outer surface of said shaft which is in frictional contact.

References Cited

UNITED STATES PATENTS

| | | |
|---|---|---|
| 1,264,494 | 4/1918 | D'Orville. |
| 1,499,573 | 7/1924 | Ennis. |
| 1,798,938 | 3/1931 | Hallett. |
| 2,562,404 | 7/1951 | Aland. |
| 2,609,805 | 9/1952 | Pescara. |
| 2,665,669 | 1/1954 | Ellis _____ 123—90 |
| 2,944,536 | 7/1960 | Payne. |
| 3,255,513 | 6/1966 | Robinson et al. |

FOREIGN PATENTS

| | | |
|---|---|---|
| 503,111 | 5/1951 | Belgium. |
| 1,098,374 | 3/1955 | France. |
| 1,191,787 | 4/1959 | France. |
| 353,756 | 10/1937 | Italy. |

AL LAWRENCE SMITH, Primary Examiner

U.S. Cl. X.R.

123—90; 184—6